United States Patent [19]

Murphy et al.

[11] Patent Number: 5,071,281

[45] Date of Patent: Dec. 10, 1991

[54] JOINING DEVICE

[76] Inventors: Peter J. Murphy, 10 River Parade, Hallet Cove, South Australia, 5158; Kym F. Scanlon, 11 Coolalie Road, Sheidow Park, South Austrailia, 5158 both of Australia

[21] Appl. No.: 537,079

[22] Filed: Jun. 12, 1990

[30] Foreign Application Priority Data

Jun. 15, 1989 [AU] Australia .............................. PJ 4749

[51] Int. Cl.$^5$ .............................................. F16B 12/36
[52] U.S. Cl. .................................... 403/295; 403/401
[58] Field of Search ............ 403/295, 292, 381, 408.1, 403/382, 401, 402

[56] References Cited

U.S. PATENT DOCUMENTS

| 956,711 | 5/1910 | Kellogg | 403/401 |
|---|---|---|---|
| 2,101,349 | 12/1937 | Sharp | 403/295 X |
| 2,733,788 | 2/1956 | Farmer . | |
| 3,218,097 | 11/1965 | Bowers et al. | 403/295 |
| 3,269,455 | 8/1966 | Gillotti | 403/295 X |
| 3,321,223 | 5/1967 | Snow et al. | 403/295 X |
| 3,322,448 | 5/1967 | Rolland | 403/295 |
| 3,898,728 | 8/1975 | Souseau | 403/295 X |
| 3,899,258 | 8/1975 | Matthews | 403/401 X |
| 4,124,322 | 11/1978 | Parisien | 403/295 |
| 4,261,148 | 4/1981 | Scott | 403/295 X |
| 4,405,255 | 9/1983 | Wallace | 403/295 X |
| 4,596,488 | 6/1986 | Schendan | 403/295 X |
| 4,635,579 | 1/1989 | Marker et al. | 403/295 X |
| 4,913,579 | 4/1990 | Campana | 403/381 X |

FOREIGN PATENT DOCUMENTS

| 575567 | 4/1933 | Fed. Rep. of Germany | 403/295 |
|---|---|---|---|
| 1464703 | 11/1966 | France | 403/295 |
| 478325 | 10/1969 | Switzerland | 403/295 |

Primary Examiner—Peter M. Cuomo
Assistant Examiner—Heather Chun
Attorney, Agent, or Firm—Brown, Martin, Haller & McClain

[57] ABSTRACT

A joining device for joining adjacent frame members and in particular for joining picture frame members has at least two connected limbs having a trapezoidal cross-section with a first angle between the limbs. The first angle corresponds to the angle between adjacent frame members. The frame members have mitred ends and are provided with a recess, also having a trapezoidal cross-section, into which the limbs can be inserted, which results in abutment and joining of respective frame members. The trapezoidal shape of the joining device provides resistance to twisting of the frame members and also ensures a firm frictional engagement to hold the mitred ends of the frame members together. The joining device may have a second angle between the longitudinal axes of the limbs which results in the front surface edges of the mitred ends being forced together so as to make a less obvious join line between frame members.

2 Claims, 3 Drawing Sheets

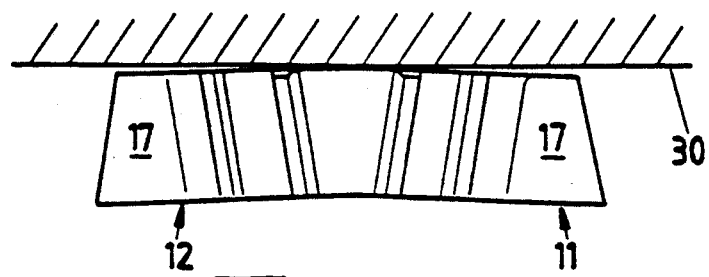
FIG 5 (VIEW E)
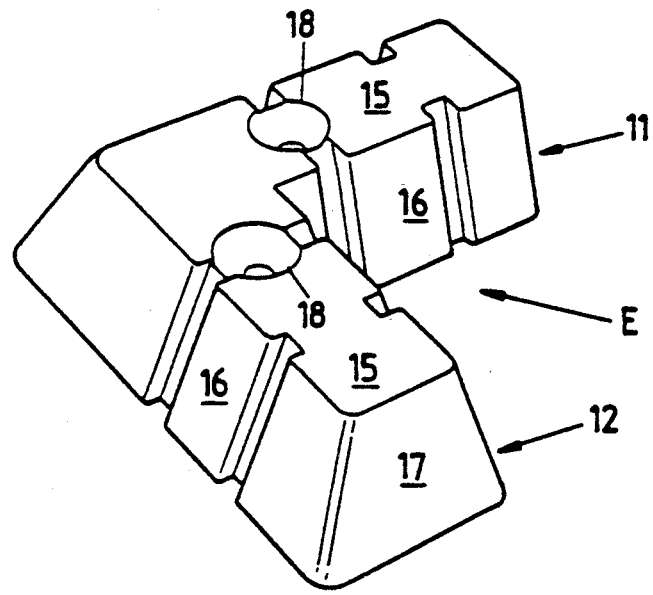
FIG 4
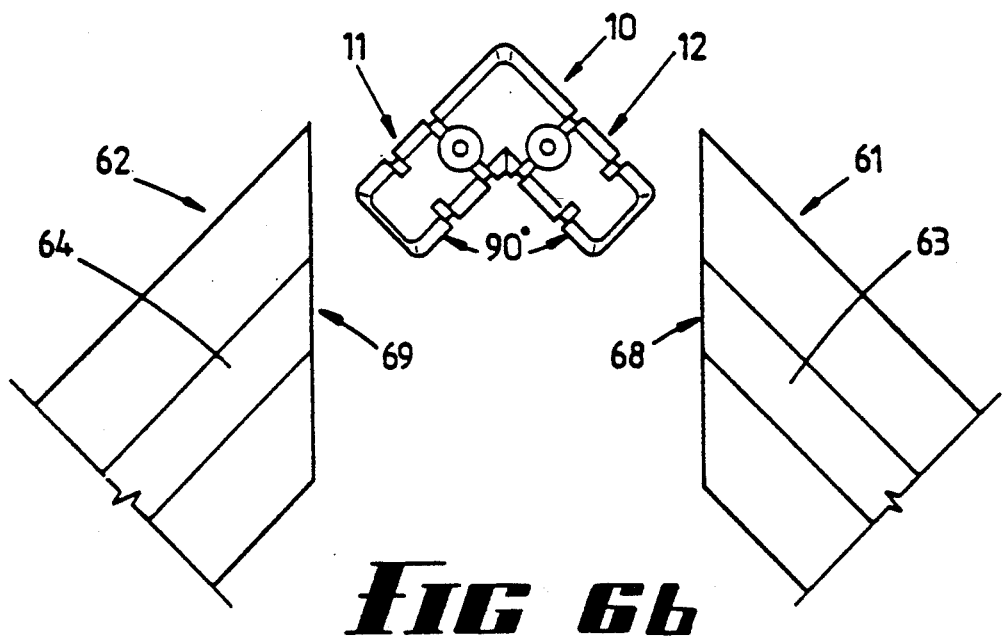
FIG 6b

JOINING DEVICE

BACKGROUND OF THE INVENTION

This invention relates to a device for joining adjacent frame members, such as picture frame members, where the ends to be joined are bevelled at matched angles to form a mitre joint.

A mitre-joint is formed when two frame members having the same cross-sectional shape are joined at their ends. Normally the ends to be joined are bevelled at equal angles. This type of joint is used in the aluminium security door construction industry, when, for example, upright members are joined to the top and bottom members to form a rectangular frame surrounding the security grille. Mitre joints are also extensively used in the carpentry trade for framing and end jointing of timber trim. The joining of such frame members must result in a strong and stable joint, and it is desirable that the join line be as unobtrusive and as invisible as possible.

Mitre-joints are also used to join the four side pieces of a picture frame, where it is important that the joints do not open or work loose and the joining means is to be kept hidden from view.

Of course many different types of materials for various applications are so joined, for example, wooden and plastic picture frame material, wooden architraves, aluminium and structural steel frame work.

The making of a correct mitre-joint requires a deal of skill which ensures that the bevel of each piece is complementary with the abutting piece and that an appropriate joining means is chosen and applied correctly so that the join line has a close fit and is therefore barely visible. It takes time and expertise to make each join and not always is the correct combination of material and method used. Problems commonly occur when the joining means chosen is inappropriate for the final use of the joint, alternatively the tightening of the joint fixing means actually opens the joint rather than closes it resulting in the visual appearance of the joint being less than satisfactory.

Sometimes the joining means causes the pieces being joined to twist about their longitudinal axis even though they are positioned correctly before being fixed with the joining means. This can be caused by the use of joining means such as screws or nails, which are difficult to use without causing relative movement of the frame members.

The making of a frame is therefore considered a skilled task. There is however a need for a simpler joining system where an unskilled person can easily assemble such frames. It is an object of this invention to provide a joining device which allows easy and stable construction of frame members using mitre-joints. The advantages of such a device would ensure ease and speed of construction resulting in a consistent quality of framing joint which are capable of being easily assembled.

SUMMARY OF THE INVENTION

Therefore in its broadest form the invention comprises a 25 joining device for joining at least two frame members, wherein said frame members have mitred ends for abutment which form a first included angle between adjacent frame members, and wherein each said frame member has recess forming walls extending longitudinally from said abutting end to define a recess having a trapezoidal cross-section, said joining device comprises a pair of limbs which are resiliently deformable and connected to define an included angle equal to said first angle, each said limb having a trapezoidal cross-sectional shape formed by a planar upper wall, and substantially planar non-parallel side walls connected to said upper wall, each said limb having at least one pair of grooves in said side walls, each groove of said pair located opposite one another in respective side walls of each said limb, and extending across each side wall to allow longitudinal compression of each limb, said limbs being dimensioned so as to form a tight sliding fit when inserted into the recesses to join the frame members together with the mitred end surfaces abutting, said fit being sufficiently tight to cause longitudinal compression of the limbs.

In a further aspect of this invention the joining device may have a second angle between the longitudinal axes of each limb. This second angle is greater than 180°, as seen from a side view of each limb, and each longitudinal axis is angularly displaced with respect to an horizontal plane. This means that the upper surface of each limb is not coplanar, and that when the frame members are joined, the mitred ends of the frame are forced together at their front surfaces so as to form a close fit along this edge of the joint.

DESCRIPTION OF THE PREFERRED EMBODIMENTS

In order that the invention may be clearly understood and readily carried into effect, a preferred embodiment will now be described by way of example only, with reference to the accompanying representations, wherein:

FIG. 4 shows, a perspective view of the joining device,

Figure 6A:
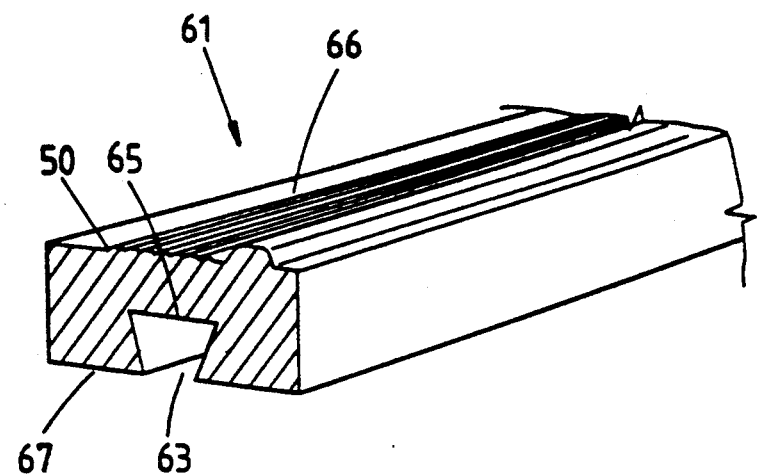
Figure 7:
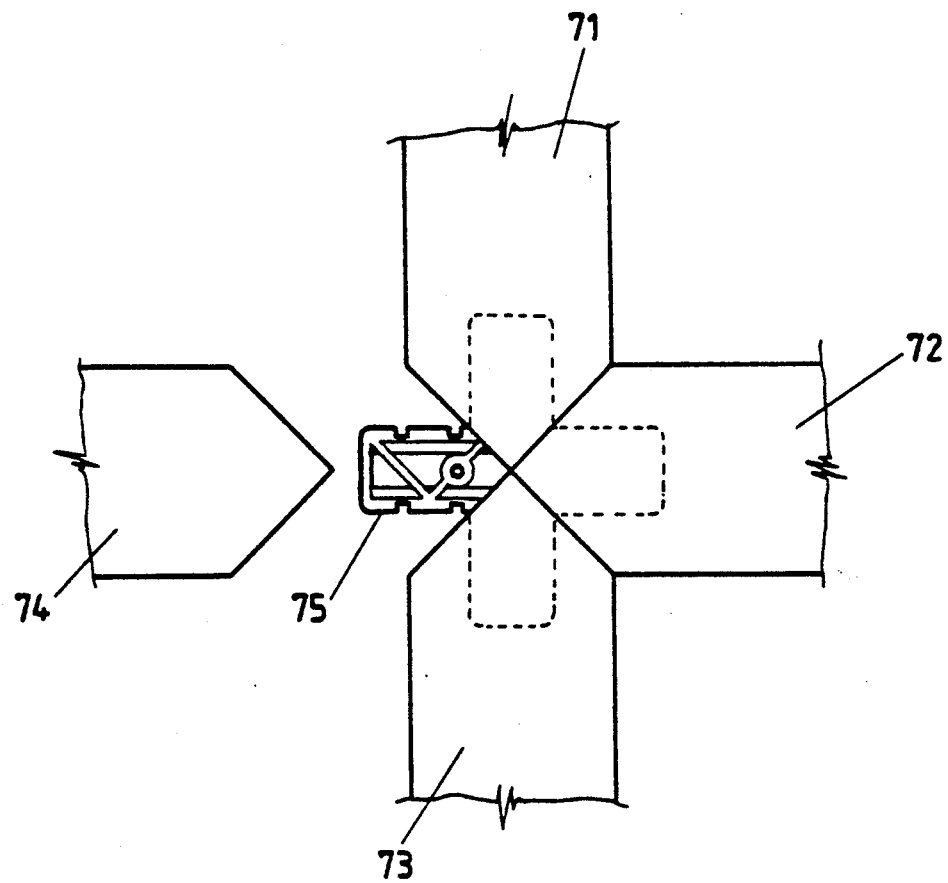

FIG. 5 shows a view of the joining device in direction E illustrating the angle to the horizontal of the two limbs, FIG. 6a shows a cross-sectional view of the frame material to be joined, and FIG. 6b shows a view of the joining device in relation to picture frame members that are to be joined, FIG. 7 shows a further embodiment of the joining device having four limbs for joining four frame members.

A top view of this embodiment is depicted in FIG. wherein the joining device 10 comprises two limbs 11 and 12 which are connected so as to form a first included angle, which in this embodiment is a right angle. As can be seen in the drawings the cross-sectional shape of limbs 11 and 12 is trapezoidal.

Each of the limbs 11 and 12 of the joining device 10 comprise a planar upper wall 15, and a pair of substantially planar non-parallel side walls 16. End walls 17 are provided at the end of each limb 11 and 12.

Figure 1:
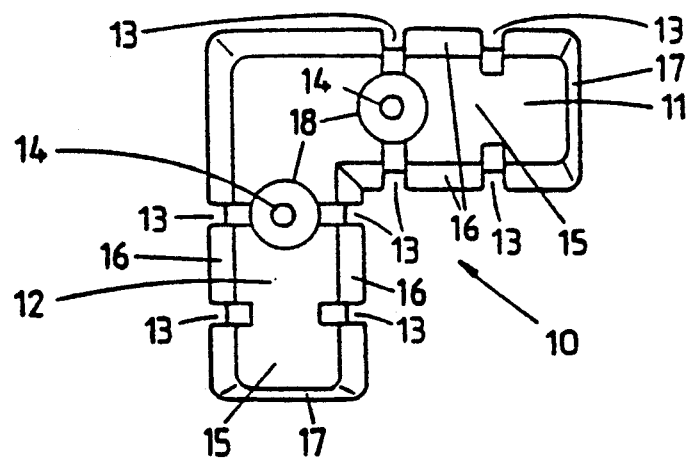
FIG. 1 shows a plan view of the joining device having two limbs.
Figure 2:
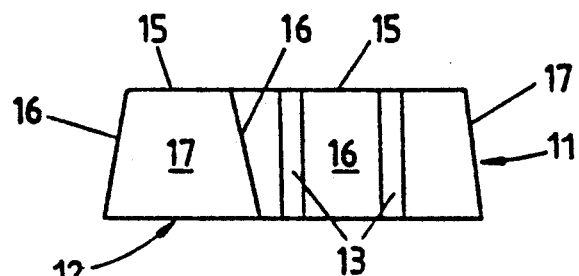
FIG. 2 shows a side view of the joining device.
Figure 3:
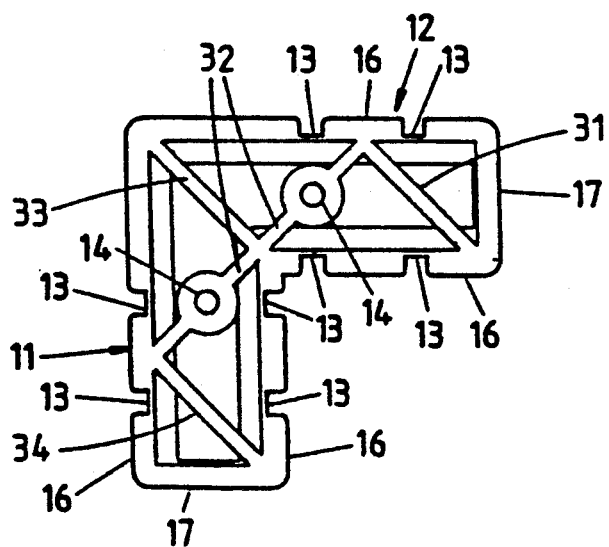
FIG. 3 shows, a bottom view of the joining device.

As shown in FIG. 3, a plurality of ribs 31 to 34 are incorporated in the upper wall 15, and the side walls 16. The ribs 31 to 34 extend between the side walls 16. The positioning of the ribs is designed to strengthen the joining device 10, and prevent twisting of each of the limbs 11 and 12, and to prevent relative movement between the limbs 11 and 12. In addition, the ribs help hold the upper wall 15 and side walls 16 in a trapezoidal shape. As seen in FIG. 3, the screw holes 14 are located in enlarged portions of flange 32 which assist in the location of fixing screws. As shown in FIG. 1 and FIG. 4, tapered recesses 18 are provided for countersinking of screw heads.

FIG. 6a shows a picture frame member 61 with a recess 63 located in a rear surface 67. The front surface of 66 of the frame member 61 is provided with a sculptured decorative surface. The widest portion 65 of the recess 63 is innermost in the frame member 61, which in turn means that when a limb of the joining device 10 is inserted within the recess 63, the upper wall 15 will be exposed on the rear surface 67. As shown in FIG. 6b, a pair of frame members 61 and 62 are provided with mitred ends 68 and 69. The mitred ends 68 and 69 are at 45° to the longitudinal axis of the frame members 61 and 62. This in turn forms a mitre joint with an included angle between the frame members of 90°. This equals the first included angle of 90 between the limbs 11 and 12 of the joining device 10.

In this embodiment, the joining device 10 is moulded from high tensile plastic material, and the frame members to be joined can be either moulded plastic, timber, or metal, or combinations thereof.

The side Walls 16 of each limb 11 and 12 are provided With pairs of grooves 13. Each groove 13 of each pair is located opposite one another in respective side walls 16 of each limb 11 or 12. The grooves 13 extend across each side wall 16 downwardly from upper wall 15. The tight sliding fit of each limb 11 and 12 within respective grooves 64 and 63, causes the limbs 11 and 12 to engage the recesses 63 and 64 more tightly, thereby providing a stronger joint.

In order to further secure the joining device 10, screws may be located in holes 14 and driven into the frame members 61 and 62.

Provided that the recesses 63 and 64 are accurately cut within the frame members 61 and 62, the joining device 10 will ensure accurate orientation between the mitred surfaces 68 and 69. In order to assemble the frame, the joining device 10 is forced into the recesses 63 and 64, and the frame members 61 and 62 are forced together such that the mitred ends 68 and 69 come together. Glue may be used on both the joining device 10 and on the mitred ends 68 and 69. The grooves 13 assist in trapping glue therein which further acts to key or hold the joining device 10 in place. The frame members 61 and 62 are then held flat and the glue allowed to set.

FIG. 5 shows view E as seen in FIG. 4, and depicts diagrammatically a second angle between the longitudinal axis of the limbs 11 and 12. The second angle is formed between the longitudinal axes of the limbs 11 and 12 such that the upper surfaces 15 of each limb 11 and 12 are not co-planar. As shown in FIG. 5, each of the upper walls 15 have a small angular displacement from the horizontal plane 30, such that the second angle is greater than 180°.

As the frame members 61 and 62 are joined together and held flat, the joining device deforms to a flattened position, which results in the resilience of the material forcing the edges 50 of each frame member 61 and 62 together. This assists in forming a close fit between the mitred surfaces 68 and 69.

In this embodiment, the second angle is approximately 182°, however this angle may vary according to the material used to mould the joining device 10.

This embodiment depicts a joining device 10 having a first included angle of 90°. Obviously, this angle may be varied depending on the respective angle that is desired between the frame members.

Further, FIG. 7 shows a view of an embodiment of the joining device 10 whereby four frame members 71-74 having suitably mitred ends can be joined by locating onto respective ends the limbs of the joining device 10. Limb 75 of the joining device 10 is shown ready to accept the placement of frame member 74 to complete the four-way framing joint.

It will be apparent to those skilled in the art that the trapezoidal recesses may comprise both trapezoidally shaped holes or grooves formed in the ends of the frame members.

We claim:

1. A joining device for joining at least two frame members, wherein said frame members have a front surface and mitred ends for abutment which form a first included angle between adjacent frame members, each said frame member having recess forming walls extending longitudinally from said mitred ends to define a recess having a trapezoidal cross-section, said joining device comprises a pair of limbs which are resiliently deformable and connected to define an included angle in the plane of said frame members equal to said first included angle, each said limb having a trapezoidal cross-sectional shape formed by a planar upper wall, and substantially planar non-parallel side walls connected to said upper wall, each said limb having at least one pair of grooves in said side walls, and extending from said upper wall down the side walls of each limb;

said limbs being dimensioned so as to form a tight sliding fit when inserted into a respective recess to join the frame members together with the mitred end surfaces abutting; and the upper walls of said limbs are not co-planar and have an obtuse second angle between the longitudinal axes of said upper walls in a plane perpendicular to the plane of said frame members, such that when the frame members are joined, said mitred ends are forced together at their front surfaces.

2. A joining device according to claim 1 wherein said second angle is less than 182°.

* * * * *